United States Patent [19]

Weber

[11] 4,135,214

[45] Jan. 16, 1979

[54] METHOD AND APPARATUS FOR COMPRESSING FACSIMILE TRANSMISSION DATA

[75] Inventor: Donald R. Weber, Saratoga, Calif.

[73] Assignee: Dacom, Inc., Santa Clara, Calif.

[21] Appl. No.: 838,454

[22] Filed: Jul. 2, 1969

[51] Int. Cl.[2] .................. H04N 7/12; H04N 1/00
[52] U.S. Cl. ................... 358/261; 340/347 DD
[58] Field of Search ............. 178/6 BW; 325/38; 340/347 D; 358/260, 261

[56] References Cited

U.S. PATENT DOCUMENTS 2,963,551  12/1960  Schreiber .................. 178/6 BW
3,347,981  10/1967  Kagan ...................... 178/6 BW Primary Examiner—Howard W. Britton
Attorney, Agent, or Firm—Fulwider, Patton, Rieber, Lee & Utecht

[57] ABSTRACT

A method and apparatus wherein novel adaptive encoding and decoding processes are utilized to reduce the quantity of symbols or descripters required to transmit or store different classes of digital information. The codes used to describe repetitious binary sequences are caused to vary in length in accordance with a well-defined procedure to more efficiently represent the original data.

32 Claims, 11 Drawing Figures

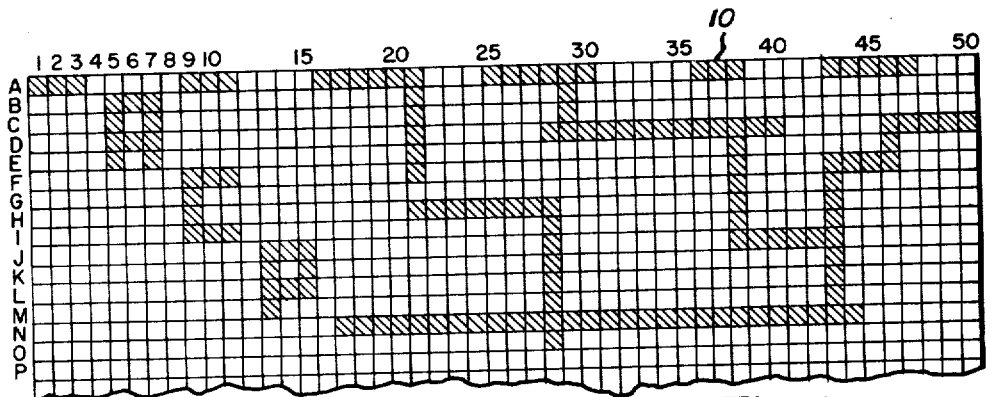
Fig_1
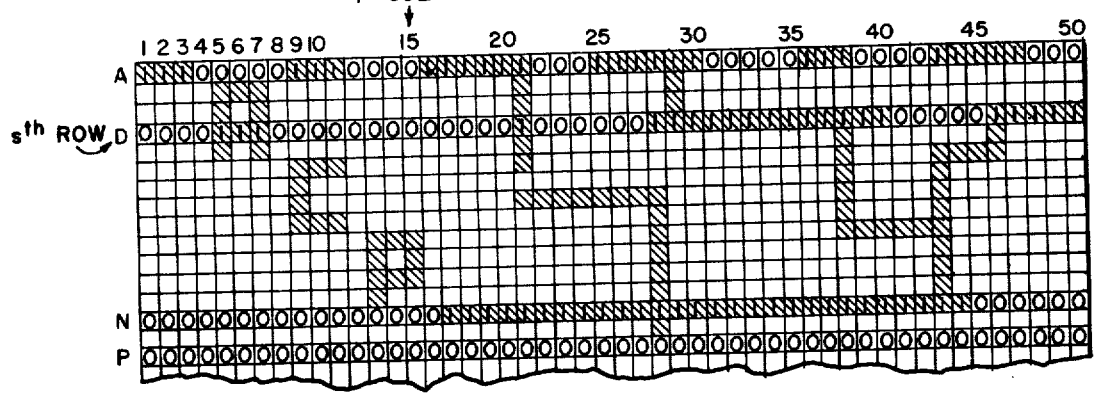
Fig_2
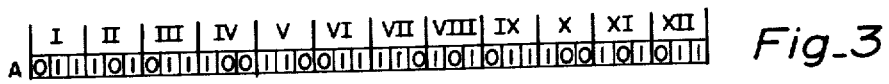
Fig_3
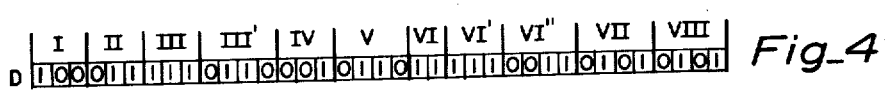
Fig_4
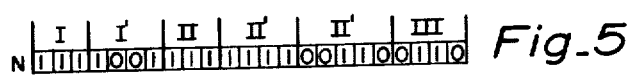
Fig_5
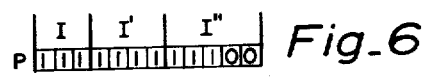
Fig_6
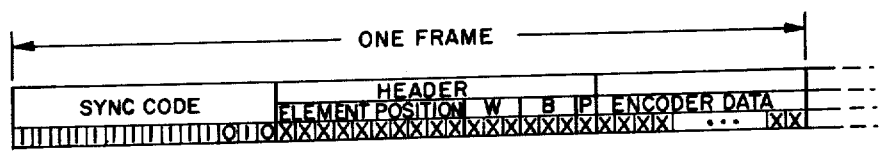
Fig_7
INVENTOR
DONALD R. WEBER

| 2 BIT CODES | | 3 BIT CODES (COMPLEMENTED) | | 4 BIT CODES | |
|---|---|---|---|---|---|
| BINARY | RUN LENGTH | BINARY | RUN LENGTH | BINARY | RUN LENGTH |
| 00 | 1 | 111 | 0 | 0000 | 0 |
| 01 | 2 | 110 | 1 | 0001 | 1 |
| 10 | 3 | 101 | 2 | 0010 | 2 |
| 11, 111 | 4 | 011 | 3 | 0011 | 3 |
| | | ⋮ | ⋮ | ⋮ | ⋮ |
| | | 001 | 6 | 1110, 11110 | 14 |
| | | 000, 0000 | 7 | 1111 | NOT PERMITTED |

| 5 BIT CODES (COMPLEMENTED) | | 6 BIT CODES | |
|---|---|---|---|
| BINARY | RUN LENGTH | BINARY | RUN LENGTH |
| 11111 | NOT PERMITTED | 000000 | 0 |
| 11110 | 0 | 000001 | 1 |
| 11101 | 1 | 000010 | 2 |
| 11100 | 2 | 000011 | 3 |
| ⋮ | ⋮ | ⋮ | ⋮ |
| 00001 | 29 | 111110, 000000 | 62 |
| 00000, 000000 | 30 | 111111 | NOT PERMITTED |

*Fig_8*

| TRANSITION | PREFIX |
|---|---|
| W → B | 1 |
| B → W | 0 |
| W → T | 0 |
| B → T | 1 |
| T → B | 1 |
| T → W | 0 |

*Fig_10*

INVENTOR
DONALD R. WEBER
BY
ATTORNEY

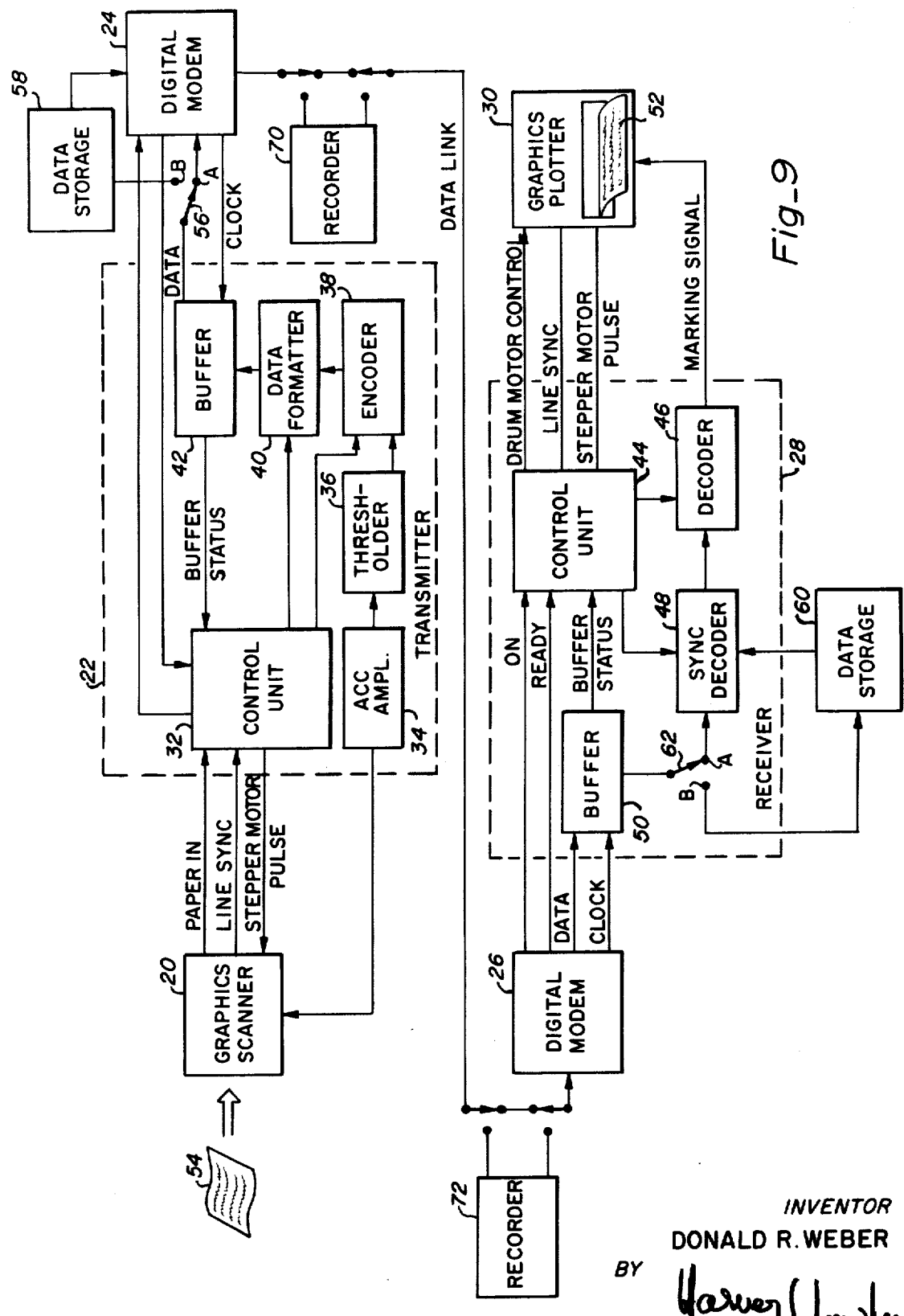
Fig_9

| PRESENT MODE | i-th COLUMN | (i+1)-th COLUMN | CARRY (SURPLUS OF 1's OR 0's) | | | | | | |
|---|---|---|---|---|---|---|---|---|---|
| | | | 3W | 2W | 1W | 0 | 1B | 2B | 3B |
| W | b | w | Wt- | Wt- | Wt- | Wt- | Wt- | Wb- | Wb- |
| W | b | t | Wt- | Wt- | Wt- | Wt- | Wb- | Wb- | Wb- |
| W | t | w | Wt- | Wt- | Wt- | Wt- | Wt- | Wt- | Wb- |
| W | t | b | Wt- | Wt- | Wt- | Wt- | Wb- | Wb- | Wb- |
| B | w | b | Bw- | Bw- | Bw- | Bt- | Bt- | Bt- | Bt- |
| B | w | t | Bw- | Bw- | Bw- | Bt- | Bt- | Bt- | Bt- |
| B | t | b | Bt- | Bt- | Bt- | Bt- | Bb- | Bb- | Bb- |
| B | t | w | Bw- | Bw- | Bw- | Bw- | Bb-/Bt- | Bb-/Bt- | Bb- |
| T | w | b | Tt-/Tw- | Tt-/Tw- | Tt- | Tt- | Tt- | Tt-/Tb- | Tb- |
| T | w | t | Tw- | Tw- | Tw- | Tt-/Tw- | Tt- | Tt- | Tt- |
| T | b | w | Tt-/Tw- | Tt-/Tw- | Tt- | Tt- | Tt-/Tb- | Tt-/Tb- | Tb- |
| T | b | t | Tt- | Tt- | Tt- | Tt- | Tt-/Tb- | Tb- | Tb- |

ODD COLUMN ROUND OFF TABLE

Fig. 11

METHOD AND APPARATUS FOR COMPRESSING FACSIMILE TRANSMISSION DATA

BACKGROUND OF THE INVENTION

The present invention relates generally to a graphics transmission system and, more particularly, to a new and improved adaptive encoding method of, and apparatus for, efficiently encoding and decoding sequential data to reduce the transmission time and/or band width required to convey graphics reproduction indicia.

The art of facsimile or graphics band width compression for use in document reproduction and transmission systems is well known and a general discussion of the prior art can be found in the U.S. patents to Fleckenstein et al U.S. Pat. No. 2,909,601, Kagan et al U.S. Pat. No. 3,347,981 and Wernikoff et al U.S. Pat. No. 3,394,352. These systems are basically comprised of some type of facsimile scanner which scans a document to be transmitted for reproduction and supplies the results of the scanning operation to a data band width reduction encoding apparatus. The data encoding apparatus then produces encoded output signals which are related in the indicia appearing on the face of the document to be reproduced. The encoded signals are subsequently transmitted to a remote receiver which decodes the received signals and supplies the decoded information to a recorder which reproduces a facsimile of the original document.

One of the principal problems encountered in the use of graphics transmission apparatus is the time required to transmit the voluminous quantity of data required to enable an accurate reproduction to be made. In the prior art attempts to compress the transmitted data, various coding configurations and techniques have been used which are typically based upon the statistical probability of the scanned information remaining stationary, or the same, for at least a finite period of time.

In the above mentioned Wernikoff et al patent, for example, a method is described which can simultaneously evaluate the compression efficiency of several different encoders, and then identify the one that is able to represent the most recent portion of the scan with the smallest number of digits. The most efficient encoder is then selected and caused to transmit the compressed data. This technique is able to selectively assign encoders in any combination, such that the encoder used at any given time is the best choice for that portion of the scan. Although the Wernikoff solution provides improved compression efficiencies for a certain class of data, its potential is limited because the number of encoders which can be incorporated is finite and the high cost of including more than three or four different encoders to accommodate different data statistics in a single system makes this solution undesirable for most applications.

In the aforementioned Kagan disclosure, a method is described wherein the scanned indicia is produced by differentiating a graphics copy in both the X and Y directions. Since the spacing between indicia may typically be short or long, Kagan et al have employed a coding technique for using a long and a short binary code in any desired combination, and they distinguish or identify which code is being used by a prefix bit preceding the associated code.

This technique has been found to work well if the long code appears quite frequently, i.e., the separation between indicia frequently being large. However, the efficiency of this system will fall off quite rapidly if many short codes are required, thus indicating small separation between indicia. This loss in efficiency is due to the fact that the required prefix bit occupies a greater percentage of bandwith for the short code (approximately 33%) than for the long code (approximately 11%).

Furthermore, the device is committed to only two code lengths which under certain indicia conditions produce unsatisfactory operation. For example, if a 3-bit short code plus the prefix bit is used, and if the indicia is spaced two picture elements apart, the system requires twice the bandwith (or transmission time) which would otherwise be required without the data compression. To overcome this problem, Kagan et al states that more code combinations can be used by adding further prefix bits to identify the expanded code selection. This, of course, will further reduce the transmission efficiency.

OBJECTS OF THE PRESENT INVENTION

It is therefore a principal object of the present invention to provide a graphics data compression system which is more efficient that those of the prior art.

Another object of the present invention is to provide a novel and improved adaptive encoding method and apparatus for reducing the transmission time and/or bandwidth required to convey scanned documents such as business letters, weather maps, newspapers, etc., which can be used with many different scanning and plotting devices.

Still another object of the present invention is to provide a novel graphics data encoding method which will automatically adapt itself in accordance with the changing run length statistics without undue device complexity.

Still another object of the present invention is to provide a method for reducing the quantity of data bits which must be transmitted in order to facilitate reproduction of the original documents without degrading the fidelity of the reproduction.

Still another object of the present invention is to provide a new and improved method and apparatus for graphics data transmission that is not subject to the above described disadvantages of the prior art encoding and compression systems and which provides a substantial reduction in the required transmission time, a higher transmission efficiency and requires less complicated and less costly apparatus.

Still another object of the present invention is to provide a new and improved method and apparatus for reducing the input-output requirements of computer generated graphics (such as weather maps), for reducing document storage requirements, and for providing a low cost means to store and forward data.

SUMMARY OF THE PRESENT INVENTION

The present invention is directed to a method and apparatus for automatically compressing, in bandwidth or time, the data required to produce, at a remote location, a facsimile copy of an original graphic document. In examining the original document, the scanned data is associated with one of two possible data states. For example, in scanning a typewritten page the scanner will sense and identify as black elements those elemental areas representing the printed type and sense and identify as white elements those elemental areas representing the unmarked surface of the paper. When the white portions and the black portions are relatively short, there is little need to compress the data, i.e., any ensueing gain will be small. However, when a major proportion of a scanned line is either all black or all white, the signal code used to transmit the data can be simplified by compressing the data required to transmit the long single color data. When compressing a mixture of short and long runs, the average reduction can be significant even through the reduction possible with short runs is generally small.

In accordance with the present invention, a method is described wherein such compression is accomplished in a digital system by selecting a code term including a first word having a binary work length of n data bits and then automatically increasing the number of words in the code term so that the code term is of the form $n + (n+1) + (n+2)...$ to accommodate a continuing data run length of like indicia. Conversely the binary word length of a code word can be reduced to less than n bits if shorter run lengths are detected.

A primary advantage of the present invention is that a new family of adaptive codes is provided that can reduce the total number of binary digits (bits) which are required to describe a scanned document and these adaptive codes can be applied to both single and multiple scan lines.

Another advantage of the present invention is that a unique transmission format is provided which minimizes the effect of transmission errors due to channel noise or temporary disruption of transmission.

Still other advantages of the present invention will undoubtedly become apparent to those skilled in the art after having read the following detailed disclosure which makes reference to the several figures of the drawing.

IN THE DRAWING

FIG. 1 is an illustrative fragment of a document containing arbitrary indicia and showing the division of the document into elemental areas.

FIG. 2 is a state diagram showing the scanner detection state of several lines of the document fragment of FIG. 1.

FIG. 3 is a transmission diagram illustrating the form of the data transmitted for row A in accordance with the present invention.

FIG. 4 is a transmission diagram illustrating the form of the data transmitted for row D in accordance with the present invention illustrating only code expansion.

FIG. 5 is a transmission diagram illustrating the encoded transmission form of row N in accordance with the present invention.

FIG. 6 is a transmission diagram illustrating the encoded transmission form of row P in accordance with the present invention.

FIG. 7 illustrates the format of a single transmission frame in accordance with the present invention.

FIG. 8 is a table illustrating the adaptive codes utilized in accordance with the present invention.

FIG. 9 is a block diagram of a preferred graphics data transmission and reproduction system in accordance with the present invention.

FIG. 10 is a table illustrating the prefix codes used to identify the type of transition encountered when using the dual line algorithm.

FIG. 11 is a round-off table for use in accordance with the present invention.

DETAILED DESCRIPTION OF THE INVENTION

The method of the present invention can be explained by making reference to the drawing wherein a document to be reproduced is generally indicated at 10 in FIG. 1. For purposes of illustration, the document 10 has been divided into 50 numbered columns and a plurality of alphabetized rows forming a grid. It will be appreciated that the intersection of any row and column will identify a discrete elemental area of the document 10.

Although the illustrated grid row is only broken up into 50 elemental areas across the page, it is, of course, to be understood that this number is chosen merely for purposes of illustration and would normally be a much larger number depending on the resolution of the scanning device used. Accordingly, the addresses for the elemental areas in each row run from 1 to 50. Thus, a scanning device having an elemental area resolution enabling it to sense or distinguish between black and white illustrated elemental areas would be capable of producing a signal corresponding to the indicia represented on the face of the document 10.

If the output of the scanning device is of digital form such that a white elemental area, upon being sensed, causes a 0 output signal to be generated, and a black elemental area causes a 1 output signal to be generated, a series of 0's and 1's, such as are illustrated in FIG. 2 of the drawing, would be produced as the device scans first row A, then row B, then row C, etc. For purposes of simplicity, however, the digital indicia representing only rows A, D, N and P have been reproduced in FIG. 2 to illustrate the invention.

It is well-known that data in this form can be transmitted over a suitable transmission link to be received by a remote receiver which can utilize the data to operate a printing apparatus for reproducing the original document at a remote location. However, by merely observing the number of indicia bits in the fragmentary portion of the document 10, as illustrated in FIG. 2, it will be noted that a serial transmission of the data required to reproduce each line would take an unduly long amount of transmission time. But, by utilizing an adaptive code technique, in accordance with the present invention, the transmission time required to transmit the indicia can be substantially reduced.

The encoding technique of the present invention is such that it will adapt itself in accordance with the changing run length of the data, and only one encoding scheme is therefore required to produce a substantial reduction in complexity with an efficiency which is in most cases much more effective than can be achieved by using a finite set of codes, as was practiced in certain prior art apparatus.

In accordance with the present invention, an adaptive code having a code term including an initial code word with a finite bit length is arbitrarily chosen. For example, one might choose a 3-bit binary code word as the initial or starting code word which would be capable of handling run lengths of consecutive black or white elemental areas of 7 or less. If the run length is of all 0's and includes less than 7 elemental areas, then the 3-bit binary code word is able to represent this run length. This being the case, each run length of 7 elemental areas of less could be transmitted in terms of a 3-bit binary code word instead of the 7 original bits which would be required to transmit the data in serial form.

Taking row A, as illustrated in FIG. 2, as an example, the selected 3-bit code word would be adequate to encode all black and white run lengths. The first three black elemental areas in row A would be represented by the 3-bit word 011. It would likewise take 3 bits to identify the following series of five white elemental areas which are represented by the code word 101. This obviously represents a small savings in terms of the total number of required bits since the required transmission time is only three-quarters of that which would have been required to transmit the data without compression.

In looking to the next series of elemental areas, namely, row A, columns 9 through 11, it is found that these three elemental areas can be represented by the 3-bit code word 011 rather than the three 0's which the serial transmission would require. Upon encountering the next transition, it will be noted that again 3 data bits are required to encode and transmit the following four bits of white indicia, namely 100. But, upon looking at the rest of row A, it will be found that the remaining transitions can all be encoded and transmitted using the 3-bit code word as shown in FIG. 3 and a net savings in transmission time is obtained for the line. Thus, by using a 3-bit code word, the 50 bits of representative data, shown in row A and representing 12 transitions, can be compressed to 36 bits of transmissible data, yielding a savings of 14 bits of transmission time.

At this point, the question must necessarily arise as to what happens when a run length of one color indicia exceeds the heretofore referenced 7 elemental areas of the document 10. One could merely allow the 3-bit system to continue and reproduce a second 3-bit code word representative of the same color data making suitable provisions to recognize the continuance of a run length. One provision is attaching a fourth identifying character bit to each 3-bit code word as has been done in the prior art, but this would effectively increase the length of each 3-bit code word to 4 bits so that, in the case of row A, it would take 12 additional bits, or a total of 48 bits, to transmit the original 50-bit signal. This is obviously an unsatisfactory solution.

In accordance with the present invention, if the actual run length of 0's or 1's, whatever the case may be, exceeds the maximum code value of 111 or 7 elemental areas of the same color, the 3-bit code word (111) is followed by a second code word which is one digit longer than the previous code word. In other words, if the run length equals or exceeds 7 elemental areas, which is the largest number that can be represented by 3 binary digits, then the encoder is required to utilize a 4-bit code word to encode the remaining portion of the run length. Thus, by utilizing a 3-bit code word until the maximum run length of 7 is encountered and following it with a 4-bit code word, a single color run length of from 7 to 21 elemental areas can be encoded. A run length of 22 or greater will require an additional expanded code word.

As an example, should a run length of 7 spaces be encountered, the 3-bit code word 111 would be generated and would be followed by a 4-bit code word of 0000 which would indicate that 7 elemental areas was the extent of the run length. This would indicate to the receiver that the run length did, in fact, stop at 7 elemental areas. Under this particular condition, no net reduction can be enjoyed since the number of bits in the 3-bit code word plus the 4-bit code word is equal to the number of elemental areas being represented. However, if the run length is between 8 and 21 elements, it is seen that a net gain will result even for expanding codes. An example of a run length requiring expansion of the code word length from 3 to 4 bits is illustrated by row D of FIGS. 1 and 2 and is shown in encoded form in FIG. 4. This example also shows that the expanded code word forms the initial code word for the next run length of the same color.

Further, in accordance with the present invention means are also provided for causing the code word lengths for a given color to contract in length by one digit after sensing a run length of less than a selected percentage of the present maximum run length capacity of that code word. In accordance with a preferred embodiment of the present invention, a short run length of 25% or less of the present word maximum run length has been chosen as the criteria for causing a one digit code word length reduction. In other words, the initial code word for the next following run length of the same color will have a length which is one digit less than the length of the last code word of the preceding code term.

As an example of a contracting code word, if the previous code term was concluded with a four-bit code word, and if the present run length is equal to or less than 25% of the maximum run length capacity of the four-bit code word, then the present four-bit code word will be decreased in length by one bit to three bits for use with the next encountered run length of the same color. In the event that the next run length is again less or equal to 25% of the maximum run length capacity of the three-bit code word, then the code word for the next succeeding run length will experience a further one-bit code word length reduction to a two-bit code word. In the event that a subsequent run length of the same color is equal to or greater than the run length capacity of the initial contracted code word, then code word expansion will take place as previously explained. It may therefore be noted that code word contraction is caused only be the previous run length and code word expansion is caused by the present run length, but that the initial code word length in a code term is determined by the immediately preceding run length of the same color.

In row D (FIG. 4), it will be seen that the first white run length of 4 white areas can be represented by the 3-bit code word 100. Similarly, the following black run length of 3 black areas can be represented by the 3-bit word 011. However, the third run length is 13 white areas long, and requires that after a count of 7 like elemental white areas has been detected and encoded into the code word 111, the encoder must in accordance with the code expansion previously described, shift to a (n+1) or 4-bit code word to encode the remaining 6 elemental white areas. Thus, the 4-bit code word 0110 immediately following the 3-bit code word 111 indicates that the run length was a total of 13 white areas in length.

The indicia then changes to black for one elemental area so that the fourth code term (IV in FIG. 4) again includes a single code word 3 bits long, and the one black space is represented by 001. It is necessary now to contract the previous black code word length to a 2-bit code word length for the next black run since 1 is less than 25% of 7. It perhaps should be pointed out here that the code lengths for the black and white runs are entirely independent of each other and may expand or contract without producing any effect on the word lengths of the other color indicia.

At the end of the fourth code term, there is another transition to white at which time the fifth run, 6 white areas in length, could be transmitted by the 3-bit code word 110 (V FIG. 4). However, since the preceding "white" code word length (III') was four bits long and the present length is not equal to or less than 25% of the maximum number of areas which can be accommodated by the 4-bit code word, the 4-bit code word must be used to start the code term for the next white run length and accordingly the fifth run (V) will be transmitted as 0110.

Upon the next transition, it will be noted that the black run length is 13 elemental areas in length, and therefore the initial 2-bit black code must expand itself to provide for this run length in excess of 3 elemental areas. This it does by first utilizing the initial 2-bit code word 11 (VI) representing the first 3 black bits, followed by an expanded 3-bit code word (VI') in the form 111, representing the next 7 black elemental areas, followed by a further expanded 4-bit code word (VI") 0010 to represent the 3 remaining black elemental areas. It is to be noted that the rules for shortening a code word length do not apply if a code word expansion has just been required within the same code term. Thus, in the above example, a 4-bit code word will be used to initiate the next black run.

The seventh and eighth run lengths are each 5 elemental areas in length, and will both be represented by the previously determined 4-bit code words 0101 (VII) and 0101 (VIII). The next black and white codes will not change since 5 is greater than 25% of 15, the maximum capacity of the 4-bit code word, and is less than 15. It will be noted that the 50 bits of transmissible data contained in the 50 elemental spaces of row D have now been compressed so as to require only 38 transmission bits, thus resulting in a savings of 12 transmission bit lengths of time.

Continuing with this simplified explanation, the next question is what happens when a run length of a single color exceeds 22 elemental areas in length? (i.e., the maximum number representable by the back-to-back 3 and 4 bit code words.) The answer is that if the 4-bit code word which follows the previous 3-bit code word is in the form 1111 (n+1), then the transmitter will shift to an (n+2) word length, and if that entire word is filled with 1's, it will again shift into an (n+3) word length, etc., as required, or until limited by the operative characteristics of the device. This can be illustrated by referring to row N of FIGS. 1 and 2 wherein it will be noted that there is a white run length of 16 spaces followed by a black run length of 27 spaces and another white run of 6 spaces.

As illustrated in FIG. 5, the first run length can, for example, be transmitted in the form of a code term which includes a first 3-bit code word 111 (I) which accounts for the first 7 elemental areas, and a 4-bit code word 1001 (I') which accounts for the next 9 elemental areas. Then a transition occurs to black wherein the first 7 black spaces are accounted for by the 3-bit code word 111 (II) which is followed by a 4-bit code word in the form of 1111 (II') which accounts for the next 15 black spaces, and finally by a 5-bit code word 00110 (II") which accounts for the next 6 black elemental areas. The data then transitions to white for the remaining 6 elemental areas of row N which are indicated by the single 4-bit code word 0110 (III).

As shown in FIG. 5, the 3 run lengths which are encountered by the scanning means in scanning row N can be transmitted by 23 data bits, thus saving 27 data bit lengths of time that would otherwise be required in a serial transmission of each elemental space representative data bit.

When the scanned line is entirely white, as in row P, the original 50 0's, indicative of the 50 white elemental areas, can be compressed into a single code term, 12 data bits in length, and comprised of the 3-bit code word 111, the 4-bit code word 1111, and the 5-bit code word 11100, as indicated in FIG. 6 of the drawing. If the previous run lengths would have expanded the white code to 6 bits, it is seen that the 50 white elementals could be represented by only 6 bits resulting in a savings of 44 bits. Thus, it will be noted that where a single color scan is encountered, the system provides a significant time or bandwidth savings. This savings as compared to uncompressed transmission becomes increasingly higher as the sensitivity of the scanner is increased (i.e., the size of the elemental areas are decreased).

The mechanism which keys the receiving equipment to inform it that a transition has occurred is a logic decoding device which enables the receiver to determine whether or not the preceding code word has reached its maximum value. In other words, if any 0's appear in a previous code word, a transition is known to occur at the beginning of the following word. If no 0's appear in a 3-bit code word, the receiver will know that a 4-bit word follows. If any 0's occur in that 4-bit code word, the receiver then knows that a transition will occur at the beginning of the next code word and the receiver will be keyed to accept an n-bit code word indicating the extent of the following run length of the opposite color. However, if no 0's appear in the 4-bit code word, then the next word will be a 5-bit code word, and so on.

To have an independent code length, one code word, or series of words making up the black code term as pointed out above, is strictly related to the black run lengths, and the subsequent code word, or series of code words, making up the white code term is solely related to the white run lengths, etc. The black and white code words always alternate back and forth unless no 0's have appeared in the previous word. Where no 0's appear in a 3-bit code word (where n=3), the word will always be followed by an (n+1) code word, etc. One of the important advantages of this scheme is that if very long runs of the same color are encountered, the system automatically shifts during transmission to longer word lengths.

There exists a high degree of correlation between consecutive black run lengths and consecutive white run lengths, i.e., short black run lengths will tend to remain short, or long black run lengths will tend to remain long. For example, the black run lengths in the heading of a newspaper article will tend to be longer than the black run lengths in the printed text. Advantage is taken of this characteristic by starting a new run length with the same code length used to terminate the previous run length of the same color. For example, if an n+3 length code is able to represent the present white run length, and is interrupted by a black indicia run, an n+3 length code is also used to start the next white run length following termination of the black indicia. The same procedure is used on the intermediate black run length as well.

In addition to the novel means of providing a new family of adaptive codes which can reduce the number of binary digits required to describe a scanned document, the present invention includes a unique transmission format which minimizes the effect of transmission errors due to channel noise and/or unintentional disruptions of transmission. The transmission format used in the preferred embodiment of the present invention for the single line adaptive encoding algorithm (technique) comprises a plurality of frames. One such frame is depicted in FIG. 7 and includes a synchronization (sync) code term, a header code term, and an encoded data portion.

A synchronization code term consisting of eleven 1's followed by 010 has been chosen for the preferred embodiment of the present invention for reasons hereinafter described although other codes could just as well have been selected. Since the encoded data is transmitted in a continuous stream of 0's and 1's, a unique synchronization code, which cannot accidentally be duplicated by the encoded data, is needed to eliminate the possibility of accidentally producing a synchronization code. It is therefore necessary to modify the previously described encoding procedure to prevent the occurrence of eleven or more consecutive 1's. This is done by complementing odd length codes and by restricting certain code values from occurring as presented in FIG. 8 of the drawing. For reasons of equipment simplicity, the maximum data code word of the preferred embodiment is restricted to a 6 bit length as shown in FIG. 8.

To enable the encoder to properly start each frame and to recover from transmission errors when they occur, additional information called the header is transmitted immediately following the synchronization code term as shown in FIG. 7. The header term includes a binary code word which denotes the starting location or address of the next elemental area to be encoded, a W code word, a B code word and a P code word. The first binary word of the header is the number or address of the first elemental area to be encoded which, in accordance with one scheme, is obtained by counting the elemental areas across each row with the count being repeated from row to row. The number of binary bits required for this first header "word" is determined by the number of elemental areas in a row or the product of the resolution of the scanner and the width of the document. In other words, every elemental area within a row is assigned a unique number and the "word" must be capable of binarily representing the largest number assigned. However, any suitable position locating scheme can be utilized to designate a frame starting elemental area.

The W code word which follows is a 3-bit code word describing the bit length of the first white run length code word in that frame. The B code word following the W code word is a 3-bit code word denoting the bit length of the first black run length code word in that frame. The 3-bit length is, of course, determined by the maximum data code word length chosen. For example, the 6-bit maximum data code word length can be described by a 3 bit B code word but if a 10-bit maximum data code word length had been chosen, a 4-bit length W or B code word would be required. The P code word is a 1-bit code word describing the state (black or white) of the first elemental area in the sequence of encoded data following the P code.

The encoded data, in the form described above, follows the header information and occupies the remaining portion of the frame. In accordance with a preferred embodiment of the present invention, the encoded data will have a variable length for a full frame of from 257 to 267 bits. The variability in the length of the data portion of the frame is caused by the different code word length possibilities. In other words, the data portion of a full frame will terminate itself upon the first transition after the number of encoded data bits exceeds 255, i.e., if the encoded data reaches 254 bits and a transition occurs which is followed by a run length which requires 7 bits of data to represent its length then the frame will terminate upon reaching the 261st encoded data bit.

Following the encoded data portion of each frame, the following frame will be introduced beginning with the frame synchronization code term and header information which starts the new frame followed by the next sequence of encoded data. As illustrated in the examples of FIGS. 3 through 6, the reduction resulting from encoding (sometimes called the compression ratio) will change from time to time in accordance with the information (number of characters or objects) being intercepted by the scan. Since the input elements rate and the transmission bit rate are usually constant, buffers must be included in the transmitting and receiving equipment to smooth out the bit rate variations created by the encoding process. Considering the extreme change in compression possible with many documents, the buffer size can become quite large. A solution to this problem is as follows:

When scanning a portion of a document which is all white, the compression ratio becomes quite large and consequently the buffer will become empty. Since a sequence of consecutive 0's resulting from an empty buffer condition would be misinterpreted by the decoder, it is necessary to terminate the old frame by inserting the synchronization and header term for a new frame whenever an empty buffer occurs, thus resulting in a short frame wherein the data portion thereof could conceivably contain anywhere from 2 to 255 data bits.

As mentioned previously, the variations in the compression ratio creates a need for extremely large buffers (approximately $1.5 \times 10^6$ bits for an $8\frac{1}{2} \times 11$ inch document scanned at 96 lines per inch. The buffer size can be reduced substantially by taking advantage of the natural storage available in the document being scanned. This can be accomplished by controlling the scanning speed if a mechanical facsimile scanner is used. For example, it can be shown that the buffer size for a facsimile system can be reduced to a bit capacity approximately equal to the transmission bit rate divided by the scan (line) rate. Buffers as small as 200 bits are typical with available facsimile equipment, representing a significant reduction in equipment complexity. The adaptive scan control feature is easily implemented by simply stopping the facsimile line advance whenever the buffer fills and by ignoring the scanned data for one complete mechanical revolution (one scan line).

Start and stop commands are also required to automatically operate the receiving, decoding and plotting equipment and to advise it that a new document is being encoded. These commands are achieved by modifying the header information of the beginning and terminating frames as follows:

(1) Start frame format; the code word for the element position number is set to binary 1111111110 and the W code word is set to binary 100. To avoid ambiguity, the actual element number can therefore never exceed decimal 1022 or binary 1111111101 so that a row cannot exceed 1022 elemental areas.

(2) Stop frame format; the code word for the element position number is set to binary 1111111110 and the W code word is set to 111.

Referring now to FIG. 9 of the drawing, there is shown a graphics scanning transmission and reproduction system of the type which may be used in carrying out the present invention. The system is basically comprised of a suitable graphics scanner 20, the output of which is coupled to a transmitter 22 which is in turn coupled into a digital modem 24. The digital modem 24 is coupled via a data link, such as a telephone line, radio link, or other suitable transmission media, to a second modum 26 at some remote location, the output of which feeds the transmitted data to a receiver 28. The output of receiver 28 is coupled to a graphics plotter 30 which utilizes the transmitted data to reproduce a facsimile of the original document.

The transmitter 22 includes a control unit 32, an automatic gain control amplifier (AGC) 34, a thresholder 36, an encoder 38, a data frame formatter 40 and a buffer 42. The analog graphics video signal obtained from the scanner 20 is amplified and adjusted automatically by the AGC amplifier 34 so that the tonal extremes produce a zero to full scale voltage variation. The thresholder then converts the gain controlled signal into pulses representing the black and white elemental areas, respectively. The encoder 38 includes logic circuitry which transforms the elemental run lengths into digital code words which continually change in accordance with the video signal behavior. This change is the adaptive code expansion and contraction discussed in detail above.

The data formatter 40 merges the encoded data with synchronization and header information and the formatted data is buffered into a constant rate bit stream by the buffer 42. The buffer operation is shared between the memory in the transmitter and a stepper motor in the graphics scanner 20, i.e., the line scanning rate is varied in accordance with buffer memory fullness.

The receiver 28 includes a control unit 44, a decoder 46 including decoding logic similar to that of encoder 38, a sync decoder 48, and a buffer 50. These components provide complementary processing to the data encoding provided by the transmitter 22. The decoded information is then utilized to drive the plotter 30 to produce a facsimile 52 of the original document 54.

When a document 54 is inserted into a graphics scanner 20, which might, for example, be an electronic CRT scanning device, or a rotating drum facsimile scanner, the transmitter 22 commands the modem 24 to establish bit synchronization. Upon modem synchronization, a start code is transmitted to turn on the graphics scanner 20 and the drum motors of the plotter 30 to advance the paper to be exposed. The document 54 is then scanned, the output of scanner 10 is encoded by encoder 38, and the encoded indicia is transmitted to receiver 28 where it is decoded by decoder 46 and delivered to the plotter 30 in approximately two minutes or less for an 8½ × 11 page. A stop command at the conclusion of transmission advances the exposed paper to clear the plotter 30 for the next document and places all facsimile and modem equipment in a standby mode. With automatic loaders, no stop command occurs until the last document has been transmitted.

In computer-graphics systems, the transmitter-encoder functions are performed by a computer and associated software. The computer output signals replace that provided by the facsimile scanner 20 and transmitter 22. The modem and receiver functions are the same as in the graphics transmission applications.

The system of the present invention may also include data storage means at either or both of the respective locations which can be used to selectively store the encoded data in time compressed form either before or after transmission. For example, where a communications channel is not immediately available the switch 56 can be switched to the B position and the compressed data stored in a suitable storage medium 58 until such time as a data link can be utilized. Furthermore, it may be desirable to store the data in compressed form at the remote location after transmission thereto. In order to enable that a suitable storage means 60 may be provided so that by simply changing switch 62 from position A to position B the time compressed data may be stored in a considerably smaller storage area than would be possible if the data was first decoded. The stored data can then be selectively routed to the plotter 30, back through the receiver 38, at any later time to cause the plotter 30 to produce the desired facsimile.

Alternately, analog recording apparatus, or the like, can be utilized at either end of transmission medium as shown at 70 and 72 to provide an inexpensive "store and forward" capability to the system. This recording apparatus can be in the form of a simple tape recorder since the modem 24 converts the signals into analog form and any wow and flutter produced by the recorders are eliminated by the buffers in the system.

Although the transmitter and receiver of the illustrated preferred embodiment can be defined as being special purpose computing devices, it is to be understood that alternatively, general purpose computers could be programmed in accordance with the invention and utilized in a similar system without departing from the scope of the invention.

In addition to the single line data compression algorithm disclosed above, alternate embodiments of the present invention include dual line and triple line data compression algorithms which enable further time compression of the transmissible data utilized to produce a facsimile reproduction of a document at some remote location. Using the multiple line algorithms the document is still scanned one line at a time. Although alternatively neighboring lines could be scanned at one time, it has been found that this is generally more complicated than the preferred system wherein one or two lines are scanned and put into memory and withdrawn in synchronization so that all lines are subsequently encoded.

The multiple line algorithms encoded the run lengths of consecutive line columns as contrasted with consecutive like elements for the single line encoding process, i.e., a column consists of two or more neighboring elemental areas which are transverse to the scan direction (located vertical to the conventional horizontal scan direction). It is seen that if two neighboring scan lines have identical indicia and were encoded with the single line encoding process described previously, a two to one reduction in encoded or compressed bits would result, and under these same conditions a three to one reduction in output could be achieved if three identical neighboring scans were encoded simultaneously.

In practice, however, it is rare that two or more neighboring lines will be identical, thus producing columns which are neither all black or all white. Columns consisting of both black and white elements are called transitional columns and are caused by non-vertical indicia transitions. Therefore the multiple line adaptive encoding techniques must be expanded to include a third adaptive code which can independently represent transition run lenghts, and a prefix bit must be added to each code to provide positive code identification. The truth table illustrated in FIG. 10 of the drawing presents the prefix bit state for representing the various code combination.

According to this truth table, if there is an abrupt change from white to black then there is a prefix in the form of a binary 1. Similarly, if there is an abrupt change from black to white, then a zero prefix is inserted. However, if a transition condition occurs sucn that the data goes from a white condition to a transition condition, the data is prefixed with a zero. Similarily, if there is a transition to a black, this is represented by a one. A transition to a white is represented by a zero.

This is actually an ambiguous code because the system does not permit going from a white to a white or a black to a black particularly if the code length is not at its maximum. By utilizing a single bit prefix it is possible for the apparatus to determine when the data goes from one mode into another mode.

A transitional column produced by two adjacent scan lines can have two possible states whereas the upper element can be a 1 and the lower element a 0, or the upper element a 0 and the lower element a 1. In order to identify these transitional states additional identification bits must be added if ambiguities and errors are to be completely avoided. However, in accordance with the present invention the need for this additional overhead is avoided by making a prediction during reconstruction so that the upper line indicia are identical to the previously transmitted lower line indicia during transitions. For example, if scan lines s and s+1 are encoded in accordance with the two line adaptive encoding process, the reconstructor or decoder at the receiving terminal will make the indicia in line s identical to the indicia of line s−1 during transitions, and the indicia of line s+1 will be made opposite to line s under these conditions.

Although this system actually makes a prediction as to the state of the transition, for the most part the prediction is correct. It has been found that mistakes are so seldom particularly at higher scan resolutions that the system is extremely effective and any mistake is so infrequent that it can hardly be noticed in the reproduction. By allowing the system to occasionally experience an error and by encoding two neighboring lines with one set of codes, the overall time reduction or bandwidth compression goes up substantially and the likelihood of error is insignificant. Compression algorithms which can introduce errors are called approximate.

The three line adaptive algorithm is similar to the two line algorithm except that three lines are simultaneously encoded and six different transitional states can occur as shown in FIG. 11. Again, to minimize the overhead required to identify the different transitional states a much larger degree of approximation is used. First, odd indicia which are located on the center line as shown by examples (b) and (e) in FIG. 11 are converted to one of the remaining examples to that the possible states are reduced in number from six to four. Secondly, the same prediction technique used for the two line algorithm is employed to determine if the black indicia in a transition are to be located at the top or bottom of th column. Thirdly, an additional indicator bit is included prior to each transitional run length code to denote if the transitional column contains one or two black indicia.

It is possible for consecutive transitional columns to have different states. Under these conditions, the algorithm determines whether a run length of consecutive transitional columns is best represented by a single or double indicia approximation. As a result of forcing all columns within a transition to be alike, it is seen that a surplus of black or white indicia can often result. Under these conditions the transitional run length is shortened or lengthened so that the number of black indicia within the approximated transition equal the number of black indicia within the approximated transition equal the number of black indicia within the original data. Maintaining the ratio between black and white indicia (picture density), is extremely important particularly for scanned half-tone data such as newspaper photographs. The transition approximation rules for the three line algorithm can also be presented by the truth or round-off table shown in FIG. 12. Where dual round-off rules are indicated separated by a diagonal slash, the upper rule is to be used where the run length is less than $2^n - 1$ (where m is the maximum code value) and the lower rule is to be used where the run length is equal to $2^m - 1$.

As used in the claims, the alphabetical letters m and n are integers which may be either the same or different, and the alphabetical letters x, y and z are integers. The alphabetical letters r, s and t are also integers which may, respectively, be equal to or different from the integers represented by the letters x, y and z.

After having read the above disclosure, it is contemplated that certain alterations and modifications of the invention will become apparent to those of skill in the art. It is therefore to be understood that this description is of a preferred embodiment, disclosed for purposes of illustration only, and is in no manner intended to be limiting in any way. Accordingly, it is intended that the appended claims be interpreted as covering all modifications which fall within the true spirit and scope of the invention. The respective alphabetical characters used in the claims may be interpreted as representing different selected numbers.

What is claimed is:

1. For use in the transmission of facsimile data, a method of encoding and time compressing data taken from a document, the face of which may be considered as being made up of a plurality of different elemental areas each of which contains indicia of a first state or indicia of a second state, comprising the steps of:

(a) sequentially examining the contents of each elemental area to identify alternating run lengths of indicia of said first and second states;

(b) counting the number of elemental areas in each run length; and (c) converting the number counted for each run length into a code term including a first code word n-bits in length and capable of representing up to x elemental areas, and a series of further code words, each having a bit length which exceeds the bit length of the preceding code word by one bit, the number of said further code words required being determined by the extent to which the number counted exceeds the capacity of said first code word.

2. A method of encoding and time compressing data as recited in claim 1 wherein the bit length of the first code word in each successive code term is expanded to have the same bit length as the last code word in the next preceding code term representing a run length of the same indicia state.

3. A method of encoding and time compressing data as recited in claim 1 wherein the bit length of the first code word in each odd numbered code term is determined by the bit length of the last code word in the next preceding odd numbered code term, and the bit length of the first code word in each even numbered code term is determined by the bit length of the last code word in the next preceding even numbered code term.

4. For use in the transmission of facsimile data, a method of encoding and time compressing data taken from a document, the face of which may be considered as being made up of a plurality of different elemental areas, each of which contains indicia of a first state or indicia of a second state, comprising the steps of:
(a) sequentially examining the contents of each elemental area to identify alternating run length of indicia of said first and second states;
(b) counting the number of elemental areas in the first run length; and
(c) converting the number counted in said first run length into a first code term including: (1) a first code word n-bits in length and having the capacity to represent up to x elemental areas; and (2) a second code word n+1 bits in length and having the capacity to represent up to y additional elemental areas if said first run length exceeds x−1 elemental areas; and (3) a third code word n+2 bits in length and having the capacity to represent up to z additional elemental areas if said first run length exceeds x+(y−1) elemental areas.

5. A method of encoding and time compressing data as recited in claim 4 wherein the bit length of the first code word in each successive odd numbered code term is determined by the bit length of the last code word in the next preceding odd numbered code term, and the bit length of the first code word in each successive even numbered code term is determined by the bit length of the last code word in the next preceding even numbered code term.

6. A method of encoding and time compressing data as recited in claim 4 and further comprising the steps of:
(d) counting the number of elemental areas in the second run length; and
(e) converting the number counted in said second run length into a second code term including: (1) a first code word m-bits in length and having the capacity to represent up to r elemental areas; and (2) a second code word m+1 bits in length and having the capacity to represent up to s additional elemental areas if said second run length exceeds r−1 elemental areas; and (3) a third code work m+2 bits in length and having the capacity to represent up to t additional elemental areas if said second run length exceeds r+(s−1) elemental areas.

7. A method of encoding and time compressing data as recited in claim 6 wherein the bit length of the first code word in a succeeding code term is reduced to one data bit less than the last code word in the next preceding code term representing the next preceding run length of the same indicia state if that next preceding code term was filled to less than a predetermined percentage of its capacity.

8. For use in special-purpose apparatus for the transmission of facsimile data, a method of encoding and time compressing data taken from the face of a document which may be considered as being made up of a plurality of different elemental areas each of which contains indicia of a first state or indicia of a second state, and transmitting such data for reproduction at a remote location, comprising the steps of:
(a) sequentially examining the contents of each elemental area to identify alternating run lengths of indicia of said first and second states;
(b) counting the number of elemental areas in the first run length; and
(c) converting the number counted in said first run length into a first code term including, (1) a first code word n-bits in length and having the capacity to represent up to x elemental areas, and (2) a second code word n+1 bits in length and having the capacity to represent up to y additional elemental areas if said first run length exceeds x−1 elemental areas, and (3) a third code word n+2 bits in length and having the capacity to represent up to z additional elemental areas if said first run length exceeds x+(y−1) elemental areas;
(d) counting the number of elemental areas in the second run length;
(e) converting the number counted in said second run length into a second code term including, (1) a first code word m-bits in length and having the capacity to represent up to r elemental areas, and (2) a second code word m+1 bits in length and having the capacity to represent up to s additional elemental areas if said second run length exceeds r−1 elemental areas, and (3) a third code word m+2 bits in length and having the capacity to represent up to t additional elemental areas if said second run length exceeds r+(s−1) elemental areas; and
(f) transmitting said code terms to said remote location.

9. A method of encoding and time compressing data as recited in claim 8 and further comprising the steps of:
receiving the transmitted code terms at said remote locations;
decoding said code terms to provide decoded data; and
using said decoded data to develop a facsimile copy of said document.

10. A method of encoding and time compressing data as recited in claim 8 and further comprising the step of storing said code terms in a data storage means prior to their transmission to said remote location.

11. A method of encoding and time compressing data as recited in claim 8 and further comprising the step of storing said code terms in a data storage means following the receipt thereof at said remote location.

12. A method of encoding and time compressing data as recited in claim 8 and further comprising the step of developing a synchronization term and a header term for transmission preceding certain ones of said code terms.

13. A method of encoding and time compressing data as recited in claim 12 and further comprising the step of transmitting said synchronization term and said header term in succession following each transmission of a predetermined number of code term bits.

14. For use in special-purpose apparatus for the transmission of facsimile data, a method of scanning a document and generating a series of time compressed communicative data bits corresponding to indicia of a first type and indicia of a second type appearing on the face of said document, comprising the steps of:
subdividing the face of said document into a plurality of discrete elemental areas;

sequentially examining each of said elemental areas to determine the type of indicia occurring therein;

determining run lengths of the indicia by counting the number of elemental areas between each transition from one type of indicia to the other type of indicia;

developing a code term representative of each run length, said code term including, (1) a first code word having a first data bit length capable of indicating up to a first number of elemental areas, and (2) a second code word of a second data bit length capable of indicating up to a second number of elemental reas if the number of elemental areas in the run length exceeds one less than said first number, and (3) a third code word of a third data bit length capable of indicating up to a third number of elemental areas if the number of elemental areas in the run length exceeds said first number plus one less than said second number.

15. A method as recited in claim 14 wherein the bit length of the first code word in each code term is determined by the bit length of the last code word in the next preceding run length of the same type of indicia.

16. A method as recited in claim 14 wherein the bit length of the first code word in a given code term is reduced to one less than the bit length of the last code word of the next preceding code term representing the next preceding run length of the same indicia type if the length of said next preceding run length was less than a predetermined percentage of the capacity of said next preceding code term.

17. Special-purpose facsimile data transmission apparatus for encoding and time compressing data taken from a document the face of which may be considered as being made up of a plurality of different elemental areas each of which contains indicia of a first state or indicia of a second state comprising:

means for sequentially examining the contents of each elemental area and generating a first signal each time indicia of said first state is detected and a second signal each time indicia of said second state is detected; and encoding means including logic circuitry responsive to said first and second signals and operative to count the number of signals in each successive run length of said first signals and said second signals and to develop time compressed encoded signals commensurate therewith, said encoded signals being comprised of a code term corresponding to each of said run lengths and including a first code word of a particular bit length and capable of representing up to a particular number of elemental areas, and a series of further code words each having a bit length exceeding the bit length of the preceding code word by one bit, the number of said further code words required being determined by the extent to which the number counted exceeds the capacity of said first code word.

18. Apparatus for encoding and time compressing data as recited in claim 17 wherein said logic circuitry causes the bit length of the first code word in each code term to be equal to the bit length of the largest code word in the next preceding code term tepresenting a run length of the same indicia state, unless said next preceding code term was filled to less than a predetermined percentage of its capacity, in which case said first code word is reduced in bit length by a predetermined number of data bits.

19. Apparatus for encoding and time compressing data as recited in claim 17 and further comprising a data transmission means and a remote decoding means operatively coupled to said encoding means by said transmission means, said decoding means being responsive to said encoded signals and operative to decode said code terms and develop data which can be used to provide a facsimile reproduction of said document.

20. Apparatus for encoding and time compressing data as recited in claim 17 and further comprising a data storage means for storing said encoded signals for a selected period of time.

21. In a facsimile transmission system, special-purpose apparatus for encoding and time compressing data taken from a document, the face of which may be considered as being made up of a plurality of diferent elemental areas each of which contains indicia of a first state or indicia of a second state, said apparatus comprising:

(a) means for sequentially examining the contents of each elemental area to identify alternating run lengths of indicia of said first and second states;

(b) means coupled with said means for sequentially examining, for counting the number of elemental areas in each run length; and (c) means coupled with said means for counting for converting the number counted for each run length into a code term including a first code word n-bits in length and capable of representing up to x elemental areas, and a series of further code words, each having a bit length which exceeds the bit length of the preceding code word by one bit, the number of said further code words required being determined by the extent to which the number counted exceeds the capacity of said first code word.

22. Apparatus for encoding and time compressing data as recited in claim 21, and further including means for expanding the bit length of the first code word in each successive code term to have the same bit length as the last code word in the next preceding code term representing a run length of the same indicia state.

23. Apparatus for encoding and time compressing data as recited in claim 21 wherein said means for converting into a code term includes means for determining the bit length of the first code word in each odd numbered code term by the bit length of the last code word in the next preceding odd numbered code term, and means for determining the bit length of the first code word in each even numbered code term by the bit length of the last code word in the next preceding even numbered code term.

24. Special-purpose data facsimile transmission apparatus for encoding and time compressing data taken from a document, the face of which may be considered as being made up of a plurality of different elemental areas, each of which contains indicia of a first state or indicia of a second state, said apparatus comprising:

(a) means for sequentially examining the contents of each elemental area to identify alternating run lengths of indicia of said first and second states;

(b) means coupled with said means for sequentially examining, for counting the number of elemental areas in the first run length; and (c) means coupled with said means for counting, for converting the number counted in said first run length into a first code term including: (1) a first code word n-bits in length and having the capacity to represent up to x elemental areas; and (2) a second code word n+1 bits in length and having the capacity to represent up to y additional elemental areas if said first run length exceeds x−1 elemental areas; and (3) a third code work n+3 bits in length and having the capacity to represent up to z additional elemental areas if said first run length exceeds x+(y−1) elemental areas.

25. Apparatus for encoding and time compressing data as recited in claim 24, wherein said means for converting includes means for determining the bit length of the first code word in each successive odd numbered code term by the bit length of the last code word in the next preceding odd numbered code term, and means for determining the bit length of the first code word in each successive even numbered code term by the bit length of the last code word in the next preceding even numbered code term.

26. Apparatus for encoding and time compressing data as recited in claim 24 wherein said means for converting includes means for reducing the bit length of the first code word in a succeeding code term to one data bit less than the last code word in the next preceding code term representing the next preceding run length of the same indicia state if that next preceding code term was filled to less than a predetermined percentage of its capacity.

27. In a facsimile data transmission system, special-purpose apparatus for encoding and time compressing data taken from the face of a document which may be considered as being made up of a plurality of different elemental areas each of which contains indicia of a first state or indicia of a second state, and transmitting such data for reproduction at a remote location, comprising:
(a) means for sequentially examining the contents of each elemental area to identify alternating run lengths of indicia of said first and second states;
(b) means coupled with said means for sequentially examining, for counting the number of elemental areas in the first run length; and
(c) means coupled with said means for counting, for converting the number counted in said first run length into a first code term including, (1) a first code word n-bits in length and having the capacity to represent up to x elemental areas, and (2) a second code word n+1 bits in length and having the capacity to represent up to y additional elemental areas if said first run length exceeds x−1 elemental areas, and (3) a third code word n+2 bits in length and having the capacity to represent up to z additional elemental areas if said first run length exceeds x+(y−1) elemental areas;
(d) means coupled with said means for sequentially examining, for counting the number of elemental areas in the second run length;
(e) means coupled with said last mentioned means (d), for converting the number counted in said second run length into a second code term including, (1) a first code word m-bits in length and having the capacity to represent up to r elemental areas, and (2) a second code word m+1 bits in length and having the capacity to represent up to s additional elemental areas if said second run length exceeds r−1 elemental areas, and (3) a third code word m+2 bits in length and having the capacity to represent up to t additional elemental areas if said second run length exceeds r+(s−1) elemental areas; and
(f) means for transmitting said code terms to said remote location.

28. Apparatus as recited in claim 27, and further comprising:
means for receiving the transmitted code terms at said remote location;
means for decoding said code terms to provide decoded data; and
means utilizing said decoded data to develop a facsimile copy of said document.

29. Apparatus as recited in claim 27, and further comprising means for storing said code terms prior to their tranmission to said remote location.

30. Apparatus as recited in claim 27, and further comprising second means for storing said code terms following the receipt thereof at said remote location.

31. Apparatus as recited in claim 27, and further comprising means for developing a synchronization term and a header term for transmission preceding certain ones of said code terms.

32. Apparatus as recited in claim 31, and further comprising means for transmitting said synchronization term and said heater term in succession following each transmission of a predetermined number of code term bits.

* * * * *